Nov. 24, 1931.  E. T. BENNINGTON  1,833,556
WAREHOUSE LOADING SYSTEM
Filed Feb. 20, 1928  2 Sheets-Sheet 1

Fig. I.

Inventor
Earl T. Bennington
Knois Hudson & Kent
attys

Nov. 24, 1931.  E. T. BENNINGTON  1,833,556
WAREHOUSE LOADING SYSTEM
Filed Feb. 20, 1928   2 Sheets-Sheet 2

Inventor
Earl T. Bennington
By Kwis Hudson & Kent
Attorney

Patented Nov. 24, 1931

1,833,556

UNITED STATES PATENT OFFICE

EARL T. BENNINGTON, OF CLEVELAND HEIGHTS, OHIO, ASSIGNOR TO THE CLEVELAND CRANE & ENGINEERING COMPANY, OF WICKLIFFE, OHIO, A CORPORATION OF OHIO

WAREHOUSE LOADING SYSTEM

Application filed February 20, 1928. Serial No. 255,623.

This invention relates to a loading system primarily for use in connection with selective warehouses and the like, and has for its primary object simplicity of operation and efficiency of the highest degree.

The customary loading system at present employed in selective warehouses consists of manually operated trucks which are moved about by operators between the stacks or rows of articles, the operator selecting the articles and loading them upon the trucks. Such manner of loading necessitates stopping the trucks each time an article is loaded thereon so that considerable time is lost thus rendering such a system very inefficient.

Furthermore, this present system has the objection of unnecessary wear upon the floors of the warehouse due to continually moving the trucks over the floors, and also results in considerable damage to stacks of articles caused by bumping the trucks into the articles, especially when the truck is being moved around the ends of the rows of articles.

It is, therefore, another object of the present invention to eliminate the objection above indicated by providing a continuously operated load carrying means which is caused to travel along a predetermined route and which is normally out of engagement with the floors of the warehouses.

With the objects above indicated and other object hereinafter explained in view, my invention consists in the improved system and the apparatus involved therein as hereinafter described and claimed.

Referring to the drawings—

Briefly, the system includes an endless monorail track disposed along suitable aisles formed by the stacks of articles, and suspended carriers propelled along the track, which carriers are adapted to receive and transport to any desired location, articles which are systematically arranged on opposite sides of the path of travel of the carriers, so that miscellaneous loads of articles can be received by the carriers during their continuous operation.

Figure 1:
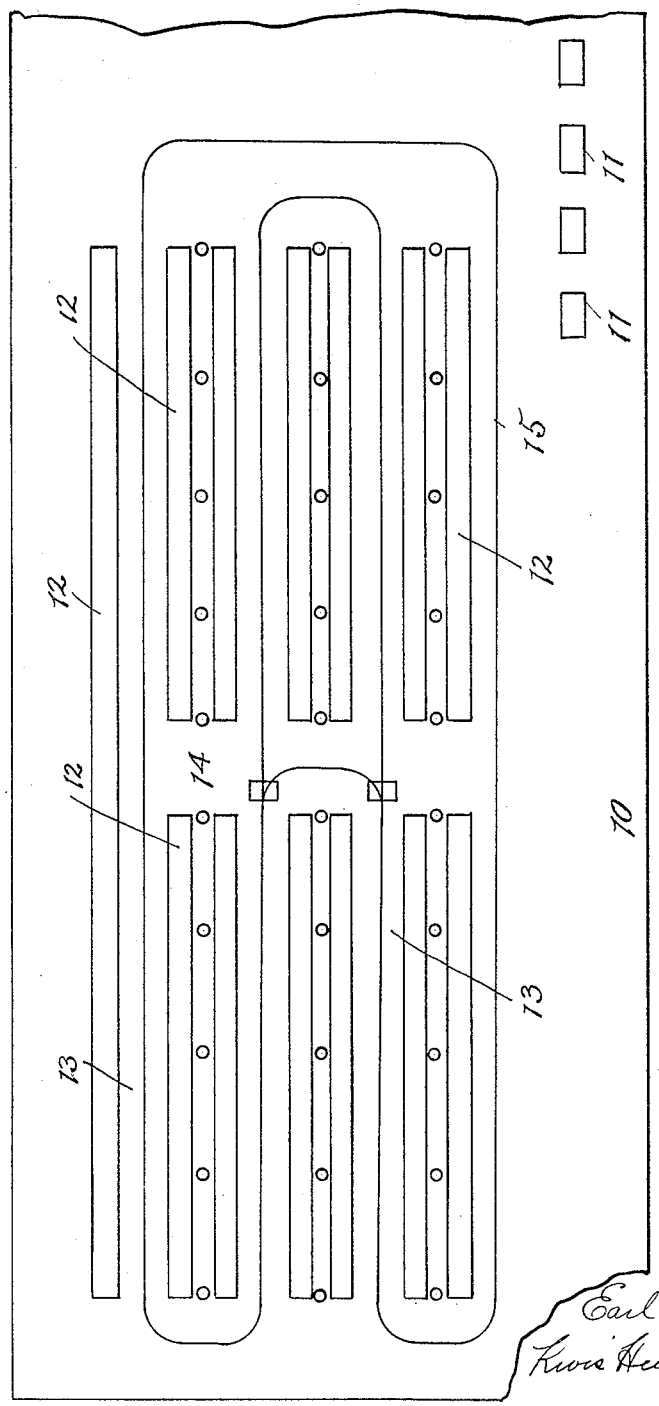
Fig. 1 illustrates diagrammatically a system involving the present invention.

In the drawings, referring particularly to Fig. 1, there is illustrated diagrammatically a warehouse 10 having a plurality of elevators 11 suitably located to conveniently receive and transfer the articles from the floors of the warehouse to motor trucks or other delivery means at the ground floor so that the truck can transport the articles to their destination.

The floors of the warehouse, of which only one is here shown, are provided with suitably located racks or stacks 12 of stored articles preferably extending longitudinally thereof and spaced apart to provide aisles 13 along which the carriers can travel in accumulating their loads. The stacks 12 can be interrupted transversely at predetermined intervals to provide aisles 14, only one being here shown, for a purpose to be later described.

Extending along the aisles 12 is a continuous overhead track system 15 which preferably begins at a point convenient to the elevators 11, extends along one aisle, around the end thereof, and back along the adjacent aisle and so on throughout the aisles, finally coming back to a position adjacent the elevators 11 so that the loaded carriers can be removed and transferred to the elevators. It should be understood that the typical layout of the stacks and aisles as illustrated in Fig. 1 is diagrammatic only as the arrangement is dependent upon the building or warehouse, and the track system and aisles will have to be arranged to suit the condition of the building.

The overhead track system 15 is preferably in the form of a monorail track 16 supported at suitable intervals by suspension rods 17 secured to a supporting structure 18, such as the ceilings of the building. This monorail track 16 has a pair of laterally extending flanges adapted to support the carriers 19 by means of wheels 20ª engaging the flanges and connected suitably to the carriers in a manner to be presently explained.

As here shown, the carriers 19 are preferably grouped in trains suitably connected together and the propelling of the train is controlled by suitable operating mechanism mounted preferably upon the first carrier. This mechanism includes a motor 20 adapted to be operated at a high speed and a motor 21 adapted to be operated at a low speed suitably connected through gear trains to the supporting wheels 20ª of the carrier to propel the carriers at either a low speed, while being loaded with articles, or at an increased speed after the carriers have been loaded and it is desired to quickly transport the load to the elevators 11. The operating mechanism further includes push buttons 22 mounted upon the carrier which are connected in a suitable circuit through the control panel 23 for controlling the operation of the motors 20 and 21. The current for the motors is supplied from a suitable conductor rail 24 extending adjacent the monorail track 16 with which contacts a trolley 25 secured to said carrier and suitably electrically connected to said control panel 23. Any typical wiring arrangement will suffice and it is not believed necessary to here illustrate a wiring diagram.

The other carriers of the group are supported by pairs of wheels 20ª at the front and rear portions of the carrier, which pairs of wheels are connected together by horizontally disposed bars 26 pivotally connected to the carrier at 27. The first carrier 19, or the power operated one, is flexibly connected to the adjacent or following carrier by a short coupling 28, while the remainder of the carriers in the group or train are flexibly connected together by a long coupling 29 which will permit the articles upon the carriers to be unloaded from the rear in a novel manner to be presently explained. The first or head carrier is unloaded from the front in view of the fact that the operating mechanism is mounted upon the rear of the first carrier.

Inasmuch as each of the carriers is substantially identical in construction, it is believed that a description of one will suffice. The carriers 19 each consist of uprights 30 forming the corners of the carrier which have their upper ends secured to a horizontally disposed rectangular frame 31 from which the carriers are supported by the wheels 20ª. The lower ends of the uprights 30 are connected longitudinally but not transversely, by angles 32 which have one of their legs extending inwardly to provide a support for a removable truck or load supporting platform 33 upon which the articles can be loaded. The truck has longitudinally extending side angles 34 secured thereto, and the outwardly extending legs are adapted to engage the inwardly extending legs of the angles 32 of the carrier so that the truck can be readily moved onto or removed from the carrier 19. The truck has sets of wheels 35 similar to those customarily provided upon warehouse trucks for independently supporting the same and upon which the latter can be moved from one place to another.

Figure 2:
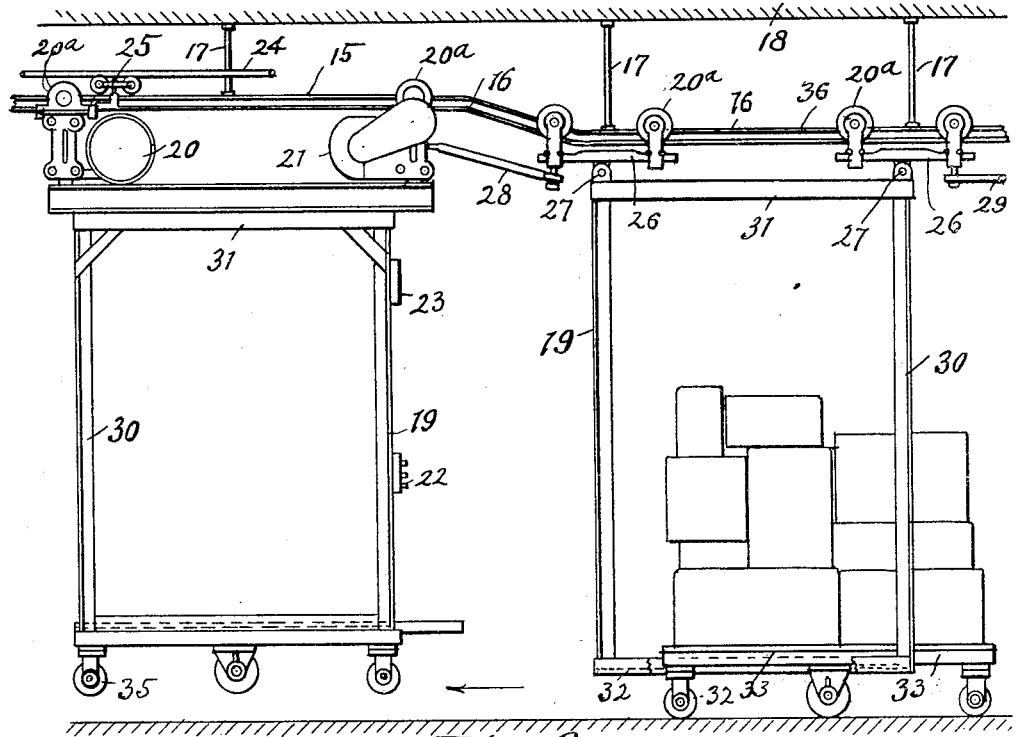
Fig. 2 is an elevational view of a portion of the system showing the manner in which the carriers are suspended from the monorail.
Figure 3:
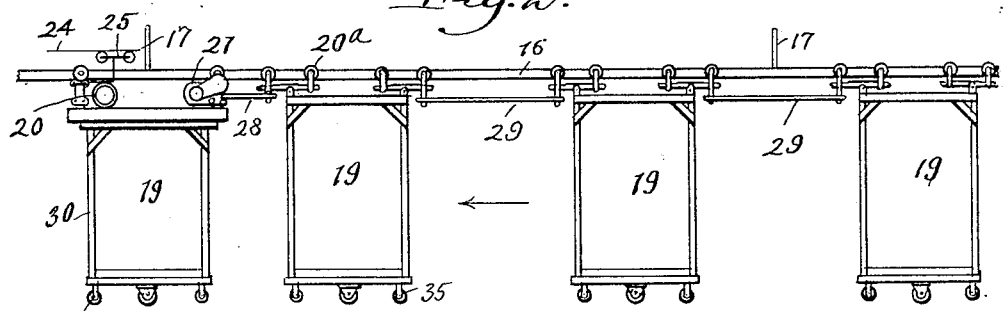
Fig. 3 shows a train of carriers suitably linked together.
Figure 4:
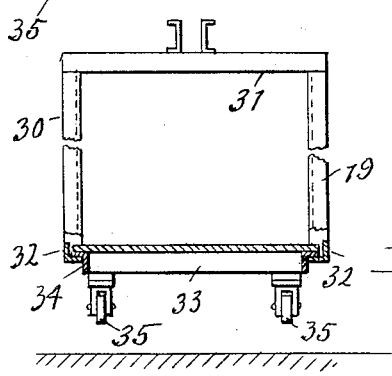
Fig. 4 shows a carrier supporting a truck or other receptacle upon which the articles can be deposited.

The overhead track system is provided with a depressed or drop section 36, as clearly shown in Fig. 2 of any suitable length and preferably in that portion of the system adjacent the elevators so that the carriers can conveniently unload the trucks containing the articles and immediately pick up an empty truck and begin to reload.

As previously stated, the trucks 33 are readily removable from and positioned upon the carriers but this operation is preferably performed substantially automatically. When the carriers 19 are being propelled along the track 16 by the motor the wheels 35 of the trucks 33 are normally free or out of engagement with the floor of the warehouse, however, as the carriers descend the drop section 36 the wheels of the trucks are lowered into contact with the floor so that the trucks being supported by their own wheels and not by the carriers are readily disengaged from the latter, and can be rolled to the elevators 11 or any other desired location. Empty trucks can be moved into proper position and picked up by the carriers and the loading operation continued.

Inasmuch as the carriers are continuously actuated at a slow speed the operator can readily select the desired articles and place them upon the truck supported by the carriers. The efficiency of the system is, therefore, materially increased without any additional burden upon the operator.

In view of the monorail system employed, the wear upon the floors of the warehouse is eliminated and the carriers having to follow a predetermined path avoids engagement with the stacks of articles and consequently any likelihood of damage thereto.

Another advantage in the system is in grouping the carriers in trains. This affords opportunity of filling completely a large order for articles or the filling of a number of small orders, and, further, it eliminates the necessity of having an individual operator for each truck as two operators will usually be able to handle the loading of several carriers.

While I have described the preferred embodiment of the invention it should be understood that I am not to be limited thereto as changes and modifications may be resorted to without departing from the spirit of the invention as defined in the appended claims.

Having thus described my invention what I claim as new is:

1. In a system of the character described, an endless overhead track disposed along a predetermined path, a carrier supported from said track, power actuated means on said carrier for propelling the latter along said track, a frame carried by said carrier and having portions extending downwardly adjacent the floor, a load supporting platform mounted on said frame at the lower portion thereof and normally out of engagement with the floor, roller means on said platform for supporting the latter independently of said frame, and a drop section in said track for lowering said carrier so that said roller members on said platform engage the floor to thereby disengage said platform from said frame.

2. In a system of the character described, an endless overhead track disposed along a predetermined path, a carrier supported therefrom, a motor supported by said carrier and adapted to propel the latter along said track, a frame carried by said carrier and having portions extending downwardly adjacent the floor, means on said frame for controlling the operation of said motor, a load supporting platform mounted on said frame at the lower portions thereof and normally out of engagement with the floor, roller means on said platform for supporting the latter independently of said frame, and a drop section in said track for lowering said carrier so that said roller means on said platform engages the floor to thereby disengage said platform from said frame.

3. In a system of the character described, an endless overhead track disposed along a predetermined path, a pair of carriers supported from said track, means for propelling said carriers along said track, a frame carried by said carriers and having portions extending downwardly adjacent the floor, said frame being pivotally connected at the forward portion to one of said carriers and pivotally connected at the rear portion to the other of said carriers, a load supporting platform mounted on said frame at the lower portions thereof and normally out of engagement with the floor, roller means on said platform for supporting the latter independently of said frame, and a drop section in said track for lowering said carrier so that said roller means on said platform engages the floor to thereby disengage said platform from said frame.

4. In a system of the character described, an endless overhead track disposed along a predetermined path, a carrier supported therefrom, means for propelling said carrier along said track, a frame carried by said carrier and having portions extending downwardly adjacent the floor, members secured to the lower portions of said frame and extending inwardly thereof, a load supporting platform having overhanging portions engageable with said members and normally supported thereby out of engagement with the floor, roller means on said platform for supporting the latter independently of said frame, and a drop section in said track for lowering said carrier so that said roller means on said platform engages the floor to thereby disengage said overhanging portions on said platform from said members on said frame.

In testimony whereof, I hereunto affix my signature.

EARL T. BENNINGTON.